(12) United States Patent
Matsunaga et al.

(10) Patent No.: US 7,773,310 B2
(45) Date of Patent: Aug. 10, 2010

(54) ZOOM LENS AND IMAGE PICKUP APPARATUS

(75) Inventors: Shigehiko Matsunaga, Kanagawa (JP); Koji Toyoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/379,826

(22) Filed: Mar. 3, 2009

(65) Prior Publication Data
US 2009/0231725 A1 Sep. 17, 2009

(30) Foreign Application Priority Data
Mar. 14, 2008 (JP) ............................... 2008-065985

(51) Int. Cl.
*G02B 15/14* (2006.01)
(52) U.S. Cl. ................ 359/683; 359/684; 359/685; 359/686; 359/714; 359/740; 359/764
(58) Field of Classification Search ................ 359/676, 359/683–687, 714, 740, 764
See application file for complete search history.

(56) References Cited

U.S. PATENT DOCUMENTS

| | | | |
|---|---|---|---|
| 6,754,446 B2 * | 6/2004 | Hagimori et al. | 359/687 |
| 7,116,489 B2 * | 10/2006 | Ohtake | 359/687 |
| 7,154,680 B2 * | 12/2006 | Satori et al. | 359/687 |
| 7,274,516 B2 * | 9/2007 | Kushida et al. | 359/687 |
| 7,443,607 B2 * | 10/2008 | Kushida | 359/687 |
| 7,626,766 B2 * | 12/2009 | Yoshitsugu et al. | 359/683 |
| 7,636,201 B2 * | 12/2009 | Sudoh et al. | 359/686 |
| 7,684,122 B2 * | 3/2010 | Shirota | 359/676 |

FOREIGN PATENT DOCUMENTS

| | | |
|---|---|---|
| JP | 05-273466 | 10/1993 |
| JP | 2000-131610 | 5/2000 |
| JP | 2004-354871 | 12/2004 |

* cited by examiner

*Primary Examiner*—Evelyn A. Lester
(74) *Attorney, Agent, or Firm*—Rader, Fishman & Grauer PLLC

(57) ABSTRACT

A zoom lens includes first to fifth lens groups respectively having positive, negative, positive, positive, and negative refractive powers in that order from the object side. Zooming is performed by moving the second lens group and the fourth lens group in an optical-axis direction. The first lens group includes a front lens group having a negative refractive power, an optical member for bending an optical path, and a rear lens group having a positive refractive power in that order from the object side. The front lens group is a cemented lens in which a first lens having a negative refractive power is bonded to a second lens having a positive refractive power in that order from the object side to the image side.

6 Claims, 10 Drawing Sheets

ZOOM LENS AND IMAGE PICKUP APPARATUS

BACKGROUND OF THE INVENTION

1. Field of the Invention

The present invention relates to a zoom lens and an image pickup apparatus. In particular, the present invention relates to a technical field of a rear focus zoom lens having a high zoom ratio and of an image pickup apparatus including the zoom lens.

2. Description of the Related Art

In recent years, a compact image pickup apparatus, such as a digital video camera or a digital still camera, has become popular. Such an image pickup apparatus is desired to be reduced in size. Owing to this, it is demanded to reduce the whole length of a photographic lens, more particularly, a zoom lens. In addition, it is demanded to increase a lens performance of the photographic lens to meet increase in the number of pixels of an image pickup device.

As an example of such a zoom lens capable of being reduced in size and increased in lens performance may be a rear focus zoom lens in which lens groups other than a first lens arranged at the most object side are moved for focusing. The whole lens system of the rear focus zoom lens is easily reduced in size, and the rear focus zoom lens can provide an image forming performance suitable for the image pickup device with a large number of pixels.

An exemplary rear focus zoom lens includes a first lens group having a positive refractive power, a second lens group having a negative refractive power, a third lens group having a positive refractive power, a fourth lens group having a positive refractive power, and a fifth lens group having a negative refractive power, in that order from the object side. In the rear focus zoom lens, for example, the second lens group and the fourth lens group are moved in an optical-axis direction for zooming, and the fourth lens group is moved for focusing (for example, see Japanese Patent No. 3015192).

As the above-described rear focus zoom lens, a zoom lens has been suggested which has a bending optical system to reduce the front-rear length of the zoom lens by bending an optical path between the first lens group and an image plane.

An exemplary four-lens-group zoom lens with the bending optical system includes, for example, a first lens group having a positive refractive power, a second lens group having a negative refractive power, a third lens group having a positive refractive power, and a fourth lens group having a positive refractive power, in that order from the object side (for example, see Japanese Unexamined Patent Application Publication No. 2000-131610).

The zoom lens disclosed in Japanese Unexamined Patent Application Publication No. 2000-131610 performs zooming by moving the second lens group and the fourth lens group in an optical-axis direction. The first lens group includes a first lens which is a single lens having a negative refractive power, an optical member (prism) for bending the optical path, and a second lens which is a single lens having a positive refractive power, in that order from the object side.

An exemplary five-lens-group zoom lens with the bending optical system includes, for example, a first lens group having a positive refractive power, a second lens group having a negative refractive power, a third lens group having a positive refractive power, a fourth lens group having a positive refractive power, and a fifth lens group having a negative refractive power, in that order from the object side (for example, see Japanese Unexamined Patent Application Publication No. 2004-354871).

The zoom lens disclosed in Japanese Unexamined Patent Application Publication No. 2004-354871 performs zooming by moving the second lens group and the fourth lens group in an optical-axis direction. The first lens group includes a first lens which is a single lens having a negative refractive power, an optical member (prism) for bending the optical path, and a second lens which is a single lens having a positive refractive power, in that order from the object side.

SUMMARY OF THE INVENTION

Meanwhile, in the zoom lens of related art with the bending optical system which bends the optical path between the first lens group and the image plane, the zoom ratio has been about 3× to 5×.

The demand to high magnification is increased today, and even in the zoom lens with the bending optical system capable of reducing the front-rear length, the demand to the high magnification is high.

However, in the zoom lens disclosed in any of Japanese Unexamined Patent Application Publication Nos. 2000-131610 and 2004-354871, since the first lens group includes the optical member and the single lenses arranged on both sides of the optical member, if the magnification is increased, for example, if the zoom ratio is set 5× or higher, chromatic aberration, such as axial chromatic aberration and transverse chromatic aberration, is markedly increased especially at the telephoto side. It is difficult to satisfy the optical performance.

Accordingly, it is desirable to provide a zoom lens and an image pickup apparatus that promote increase in magnification without an optical performance being deteriorated by reliably correcting chromatic aberration due to the increase in magnification.

According to an embodiment of the present invention, a zoom lens is provided which includes a first lens group having a positive refractive power, a second lens group having a negative refractive power, a third lens group having a positive refractive power, a fourth lens group having a positive refractive power, and a fifth lens group having a negative refractive power in that order from the object side. Zooming is performed by moving the second lens group and the fourth lens group in an optical-axis direction. In the zoom lens, the first lens group includes a front lens group having a negative refractive power, an optical member for bending an optical path, and a rear lens group having a positive refractive power, in that order from the object side. The front lens group is a cemented lens in which a first lens having a negative refractive power is bonded to a second lens having a positive refractive power in that order from the object side to the image side.

Accordingly, with the zoom lens, chromatic aberration, such as axial chromatic aberration and transverse chromatic aberration, appearing due to increase in magnification is reliably corrected.

Preferably, in the zoom lens, Conditional Expressions (1) and (2) are satisfied as follows:

$$2.5 < f1/fw < 7.0 \quad (1)$$

$$-0.7 < f11/f12 < -0.15 \quad (2)$$

where f1 is a focal length of the first lens group, fw is a focal length of the whole lens system at a wide-angle end, f11 is a focal length of the first lens, and f12 is a focal length of the second lens.

With the configuration satisfying Conditional Expressions (1) and (2), appearance of chromatic aberration and distortion can be suppressed while increase in field angle and reduction in size are promoted.

Preferably, in the zoom lens, the second lens of the first lens group is a meniscus lens having a positive refractive power, a convex surface of the second lens facing the object side.

Since the second lens is the meniscus lens having the positive refractive power with the convex surface facing the object side, the focal length of the second lens is increased.

Preferably, in the zoom lens, Conditional Expressions (3) is satisfied as follows:

$$-3.6 < f1a/f1 < -0.8 \qquad (3)$$

where f1a is a focal length of the front lens group, and f1 is a focal length of the first lens group.

Since Conditional Expression (3) is satisfied, the whole zoom lens system is reduced in size, and aberration appearing due to the cemented lens is reliably corrected.

Preferably, in the zoom lens, at least one surface of the first lens group is an aspherical surface.

Since the at least one surface of the first lens group is the aspherical surface, aberration is reliably corrected at both the wide-angle side and the telephoto side.

According to another embodiment of the present invention, an image pickup apparatus is provided which includes a zoom lens and an image pickup device that converts an optical image formed by the zoom lens into an electric signal. The zoom lens includes a first lens group having a positive refractive power, a second lens group having a negative refractive power, a third lens group having a positive refractive power, a fourth lens group having a positive refractive power, and a fifth lens group having a negative refractive power in that order from the object side. Zooming is performed by moving the second lens group and the fourth lens group in an optical-axis direction. In the zoom lens of the image pickup apparatus, the first lens group includes a front lens group having a negative refractive power, an optical member for bending an optical path, and a rear lens group having a positive refractive power, in that order from the object side. The front lens group is a cemented lens in which a first lens having a negative refractive power is bonded to a second lens having a positive refractive power in that order from the object side to the image side.

Accordingly, with the image pickup apparatus, chromatic aberration, such as axial chromatic aberration and transverse chromatic aberration, appearing due to increase in magnification is reliably corrected.

Accordingly, with the configurations, the chromatic aberration is reliably corrected. Hence, the increase in magnification can be promoted without the optical performance being deteriorated.

DESCRIPTION OF THE PREFERRED EMBODIMENTS

Figure 1:
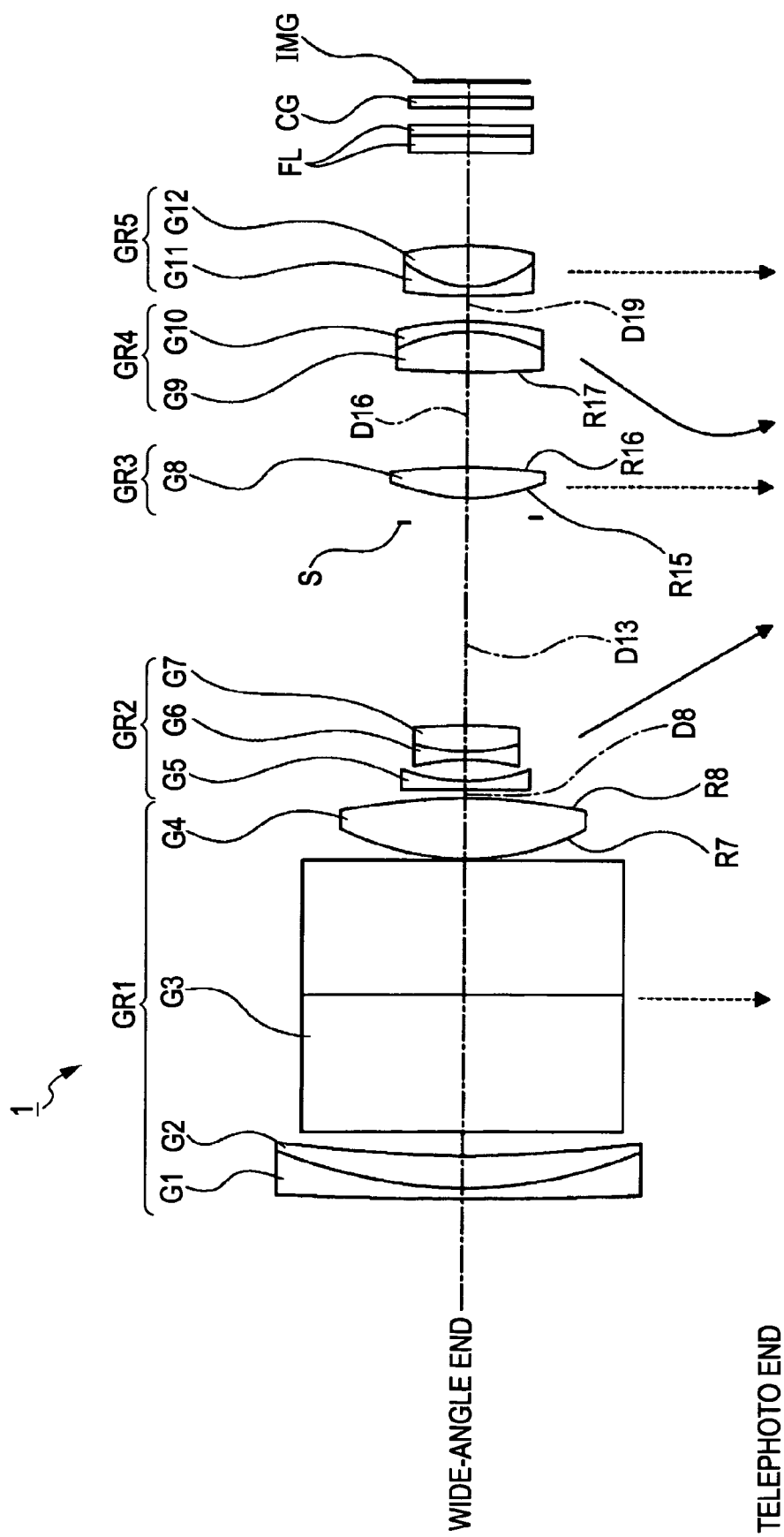
FIG. 1 illustrates a lens configuration of a zoom lens according to a first embodiment, which is a preferred embodiment to implement an image pickup apparatus and a zoom lens, together with FIGS. 2 to 10.

Preferred embodiments for implementing a zoom lens and an image pickup apparatus are described below.

First, a zoom lens according to an embodiment of the present invention is described.

The zoom lens includes a first lens group having a positive refractive power, a second lens group having a negative refractive power, a third lens group having a positive refractive power, a fourth lens group having a positive refractive power, and a fifth lens group having a negative refractive power, in that order from the object side. Zooming is performed by moving the second lens group and the fourth lens group in an optical-axis direction.

The first lens group includes a front lens group having a negative refractive power, an optical member for bending an optical path, and a rear lens group having a positive refractive power, in that order from the object side. The front lens group is a cemented lens in which a first lens having a negative refractive power is bonded to a second lens having a positive refractive power in that order from the object side to the image side.

As described above, in the zoom lens of the embodiment, since the front lens group is the cemented lens of the first lens having the negative refractive power and the second lens having the positive refractive power, aberration appearing at the first lens can be corrected by the second lens having the positive refractive power. In particular, since the front lens group is the cemented lens, if the refractive power of the second lens group is increased, for example, if magnification is increased so as to have a zoom ratio of 5× or higher, chromatic aberration, such as axial chromatic aberration and transverse chromatic aberration, appearing due to the increase in magnification can be reliably corrected. Thus, the magnification can be increased without the optical performance being deteriorated.

Also, since the front lens group is the cemented lens, the structure of a lens barrel can be simplified, and an increase in sensitivity on account of an assembly error can be suppressed.

In the zoom lens according to the embodiment of the present invention, Conditional Expressions (1) and (2) are preferably satisfied as follows:

$$2.5 < f1/fw < 7.0 \qquad (1)$$

$$-0.7 < f11/f12 < -0.15 \qquad (2)$$

where f1 is a focal length of the first lens group, fw is a focal length of the whole lens system at a wide-angle end, f11 is a focal length of the first lens, and f12 is a focal length of the second lens.

Conditional Expression (1) determines a ratio of the focal length of the first lens group having the positive refractive power to the focal length of the whole lens system at the wide-angle end.

If the value of Conditional Expression (1) is below the lower limit, the positive refractive power of the first lens group becomes excessively strong, and hence, the refractive power of the rear lens group having the positive refractive power becomes excessively strong. It is difficult to correct spherical aberration by the rear lens group. The refractive power of the front lens group which is the cemented lens having the negative refractive power becomes weak. It is difficult to increase a field angle.

If the value of Conditional Expression (1) is above the upper limit, the positive refractive power of the first lens group becomes excessively weak. The whole length of the zoom lens is increased, and it is difficult to reduce the size of the zoom lens.

Conditional Expression (2) determines a ratio of the focal length of the first lens having the negative refractive power to the focal length of the second lens having the positive refractive power.

If the value of Conditional Expression (2) is below the lower limit, the negative refractive power of the first lens becomes weak relative to the positive refractive power of the second lens in the front lens group. Hence, appearance of chromatic aberration and distortion due to the negative lens is suppressed.

However, since the negative refractive power of the first lens becomes weak, an entrance pupil position is moved to the image plane side, and the effective diameter of the first lens at the most object side is increased. Owing to this, the height of light beams incident on the optical member which bends the optical path is increased. Thus, the size of the optical member becomes large. It is difficult to reduce the size of the whole zoom lens system.

If the value of Conditional Expression (2) is above the upper limit, the negative refractive power of the first lens becomes strong relative to the positive refractive power of the second lens in the front lens group. The entrance pupil position is moved to the object side. The effective diameter of the first lens at the most object side can be decreased. Accordingly, the height of the light beams incident on the optical member which bends the optical path is decreased. The size of the optical member can be reduced, and the size of the whole zoom lens system can be reduced.

However, since the negative refractive power of the first lens becomes strong relative to the positive refractive power of the second lens, chromatic aberration and distortion due to the negative lens are increased, and the optical performance may be deteriorated.

Therefore, as long as the zoom lens satisfies Conditional Expressions (1) and (2), the field angle can be increased, the size of the zoom lens can be reduced, and the optical performance can be increased by suppressing the appearance of chromatic aberration and distortion.

In addition, in the zoom lens according to the embodiment of the present invention, the second lens of the first lens group is preferably a meniscus lens having a positive refractive power, a convex surface of the second lens facing the object side.

Since the second lens is the meniscus lens having the positive refractive power with the convex surface facing the object side, the focal length of the second lens can be increased. When a desired focal length is to be provided by the cemented lens (front lens group), appearance of aberration can be suppressed.

In the zoom lens according to the embodiment of the present invention, Conditional Expression (3) is preferably satisfied as follows:

$$-3.6 < f1a/f1 < -0.8 \quad (3)$$

where $f1a$ is a focal length of the front lens group, and $f1$ is a focal length of the first lens group.

Conditional Expression (3) determines a ratio of the focal length of the first lens group having the positive refractive power to the focal length of the cemented lens (front lens group) of the first lens group.

If the value of Conditional Expression (3) is below the lower limit, the refractive power of the cemented lens becomes excessively weak. The entrance pupil position is moved to the image plane side, and the effective diameter of the first lens at the most object side is increased. Accordingly, the height of the light beams incident on the optical member which bends the optical path is increased. The size of the optical member is increased, and it is difficult to reduce the size of the whole zoom lens system.

If the value of Conditional Expression (3) is above the upper limit, the refractive power of the cemented lens becomes strong. The entrance pupil position is moved to the object side, and the effective diameter of the first lens at the most object side is decreased. Accordingly, the height of the light beams incident on the optical member which bends the optical path is decreased. The size of the optical member can be reduced, and the size of the whole zoom lens system can be reduced.

However, since the refractive power of the front lens group becomes excessively strong, it is difficult to correct aberration appearing due to the cemented lens. The optical performance may be deteriorated.

Therefore, as long as the zoom lens satisfies Conditional Expression (3), the size of the whole zoom lens system can be reduced, and the optical performance can be increased by reliably correcting the aberration appearing due to the cemented lens.

In addition, with the zoom lens according to the embodiment of the present invention, at least one surface of the first lens group is preferably an aspherical surface.

The at least one surface of the first lens group, for example, both surfaces of the rear lens group may be aspherical surfaces. Accordingly, the optical performance can be increased at both the wide-angle side and the telephoto side.

Next, specific embodiments of the zoom lens, and numerical examples to which specific numerical values are applied to the embodiments are described with reference to drawings and tables.

Meaning of reference characters used in description is described below.

"Surface number" represents an i-th surface from the object side, "Ri" represents a curvature radius of the i-th surface from the object side to the image side, "Di" represents an axial surface distance between the i-th surface and an (i+1)-th surface, "Ni" represents a refractive index at the d-line (wavelength: 587.6 nm) of a material of the i-th lens (Gi), and "νi" is an Abbe number at the d-line of the material of the i-th lens (Gi). Regarding the surface number, "ASP" represents an aspherical surface. Regarding the curvature radius, "∞" represents a flat surface. Regarding the axial surface distance, "variable" represents that the distance of the surface is variable.

Some lenses used in the respective numerical examples have aspherical lens surfaces. The aspherical surface shape is defined by the following expression:

$$x = cy^2/[1+\{1-(1+\kappa)c^2y^2\}^{1/2}] + A4y^4 = A6y^6 + A8y^8 + A10y^{10}$$

where "x" is a distance from a vertex of a lens surface in the optical-axis direction, "y" is a height in a direction perpendicular to the optical axis, "c" is a paraxial curvature (reciprocal of curvature radius) at the lens vertex, "κ" is a conic constant, and "Ai" is an i-th order aspherical coefficient.

A4, A6, A8, and A10 are aspherical coefficients of 4th, 6th, 8th, and 10th orders.

FIG. 1 illustrates a lens configuration of a zoom lens 1 according to a first embodiment of the present invention.

Referring to FIG. 1, the zoom lens 1 of the first embodiment includes twelve lenses (including a prism which is an optical member).

The zoom lens 1 includes a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power, in that order from the object side.

In the zoom lens 1, the second lens group GR2 and the fourth lens group GR4 are moved in the optical axis direction during zooming between the wide-angle end and the telephoto end.

The first lens group GR1 includes a negative lens G1, a positive lens G2 which has a meniscus shape with a convex surface facing the object side, an optical member (prism) G3 for bending the optical axis by 90 degrees, and a positive lens G4 having aspherical surfaces on both surfaces. The negative lens G1 and the positive lens G2 define a front lens group. The positive lens G4 defines a rear lens group. The negative lens G1 and the positive lens G2 form a cemented lens having a bonding surface R2, at which a concave surface at the image side of the negative lens G1 is bonded to a convex surface at the object side of the positive lens G2. The concave surface and the convex surface have the same curvature radius.

The second lens group GR2 includes a negative lens G5, a negative lens G6, and a positive lens G7, in that order from the object side. The negative lens G6 and the positive lens G7 form a cemented lens having a bonding surface R12, at which a concave surface at the image side of the negative lens G6 is bonded to a convex surface at the object side of the positive lens G7. The concave surface and the convex surface have the same curvature radius.

The third lens group GR3 includes a positive lens G8 having aspherical surfaces on both surfaces.

The fourth lens group GR4 includes a positive lens G9 with an object-side surface being an aspherical surface, and a negative lens G10 having a meniscus shape with a concave surface facing the object side. The positive lens G9 and the negative lens G10 form a cemented lens having a bonding surface R18, at which a convex surface at the image side of the positive lens G9 is bonded to a concave surface at the object side of the negative lens G10. The convex surface and the concave surface have the same curvature radius.

The fifth lens group GR5 includes a negative lens G11 having a meniscus shape with a convex surface facing the object side, and a positive lens G12. The negative lens G11 and the positive lens G12 form a cemented lens having a bonding surface R21, at which a concave surface at the image side of the negative lens G11 is bonded to a convex surface at the object side of the positive lens G12. The concave surface and the convex surface have the same curvature radius.

An aperture stop S (aperture stop surface R14) is arranged between the second lens group GR2 and the third lens group GR3. The aperture stop S is fixed.

A filter FL and a cover glass CG are arranged between the fifth lens group GR5 and an image plane IMG, in that order from the object side.

Table 1 shows lens data of Numerical Example 1 to which specific numerical values are applied to the zoom lens 1 according to the first embodiment.

TABLE 1

| Surface No. | Ri | Di | Ni | vi |
|---|---|---|---|---|
| 1 | 200.000 | 0.7 | 1.92286 | 20.88 |
| 2 | 23.127 | 1.9136 | 1.51680 | 64.2 |
| 3 | 60.000 | 1.1594 | | |
| 4 | ∞ | 7.52 | 1.83400 | 37.34 |
| 5 | ∞ | 7.52 | 1.83400 | 37.34 |
| 6 | ∞ | 0.2 | | |
| 7 (ASP) | 14.068 | 3.0647 | 1.62263 | 58.16 |
| 8 (ASP) | −28.786 | Variable | | |
| 9 | 300.300 | 0.45 | 1.88300 | 40.8 |
| 10 | 6.921 | 1.3297 | | |
| 11 | −7.223 | 0.45 | 1.83481 | 42.72 |
| 12 | 8.092 | 1.4665 | 1.92286 | 20.88 |
| 13 | −31.146 | Variable | | |
| 14 (Aperture Stop) | ∞ | 1.2 | | |
| 15 (ASP) | 9.701 | 1.75 | 1.62263 | 58.16 |
| 16 (ASP) | −28.150 | Variable | | |
| 17 (ASP) | 38.584 | 2.3178 | 1.80139 | 45.45 |
| 18 | −8.001 | 0.5 | 1.92286 | 20.88 |
| 19 | −16.120 | Variable | | |
| 20 | 100.605 | 0.5 | 1.90366 | 31.32 |
| 21 | 5.128 | 2.3675 | 1.48749 | 70.44 |
| 22 | −15.903 | 5.0636 | | |
| 23 | ∞ | 1.12 | 1.55232 | 63.4 |
| 24 | ∞ | 0.43 | 1.56384 | 60.83 |
| 25 | ∞ | 1 | | |
| 26 | ∞ | 0.5 | 1.51680 | 64.2 |
| 27 | ∞ | 0.8 | | |
| IMG | ∞ | | | |

In the zoom lens 1, an object-side surface (R7) of the positive lens G4 of the first lens group GR1, an image-side surface (R8) of the positive lens G4 of the first lens group GR1, an object-side surface (R15) of the positive lens G8 of the third lens group GR3, an image-side surface (R16) of the positive lens G8 of the third lens group GR3, and an object-side surface (R17) of the positive lens G9 of the fourth lens group GR4 are aspherical surfaces. Table 2 shows aspherical coefficients A4, A6, A8, and A10 of 4th, 6th, 8th, and 10th orders of the aspherical surfaces of Numerical Example 1, together with conic constants κ.

In Table 2 and Table 5 (described later) showing aspherical coefficients, "E-i" represents an exponent based on 10, i.e., "$10^{-i}$". For example, "0.12345E-05" represents "$0.12345 \times 10^{-5}$".

TABLE 2

| | κ | A4 | A6 | A8 | A10 |
|---|---|---|---|---|---|
| 7th surface | 0.000 | −0.394168E-4 | 0.000E+00 | 0.000E+00 | 0.000E+00 |
| 8th surface | 0.000 | −0.465627E-4 | 0.000E+00 | 0.000E+00 | 0.000E+00 |
| 15th surface | 0.000 | −0.196708E-3 | 0.000E+00 | 0.000E+00 | 0.000E+00 |
| 16th surface | 0.000 | 0.970637E-4 | 0.000E+00 | 0.000E+00 | 0.000E+00 |
| 17th surface | 0.000 | −0.200703E-3 | 0.000E+00 | 0.000E+00 | 0.000E+00 |

In the zoom lens 1, during zooming from the wide-angle end to the telephoto end, a surface distance D8 between the first lens group GR1 and the second lens group GR2, a surface distance D13 between the second lens group GR2 and the third lens group GR3 (aperture stop S), a surface distance D16 between the third lens group GR3 and the fourth lens group GR4, and a surface distance D19 between the fourth lens group GR4 and the fifth lens group GR5 are variable. Table 3 shows variable distances of the surface distances at the wide-angle end (focal length f=4.814), the intermediate focal length (focal length f=11.384), and the telephoto end (focal length f=26.890) in Numerical Example 1, together with F-numbers Fno. and half view angles ω.

TABLE 3

| f | 4.814 | 11.384 | 26.890 |
|---|---|---|---|
| Fno. | 2.548 | 2.620 | 3.318 |
| ω | 32.992 | 14.271 | 6.029 |
| D8 | 0.600 | 6.677 | 11.093 |
| D13 | 11.393 | 5.317 | 0.900 |
| D16 | 5.311 | 2.949 | 2.401 |
| D19 | 1.391 | 3.753 | 4.301 |

Figure 2:
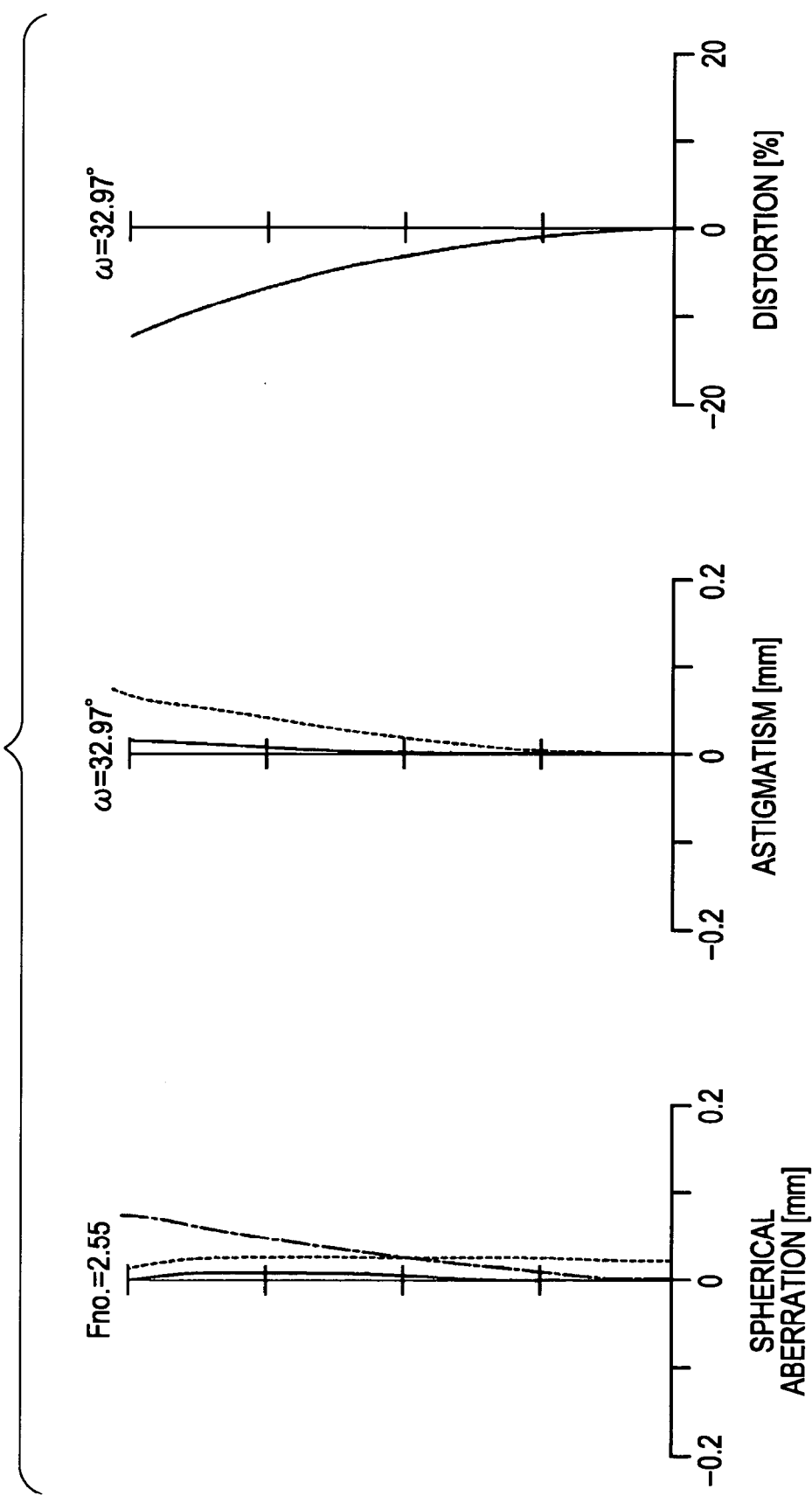
FIG. 2 illustrates aberration diagrams of a numerical example to which specific numerical values are applied to the first embodiment together with FIGS. 3 and 4, and illustrates spherical aberration, astigmatism, and distortion at a wide-angle end.
Figure 3:
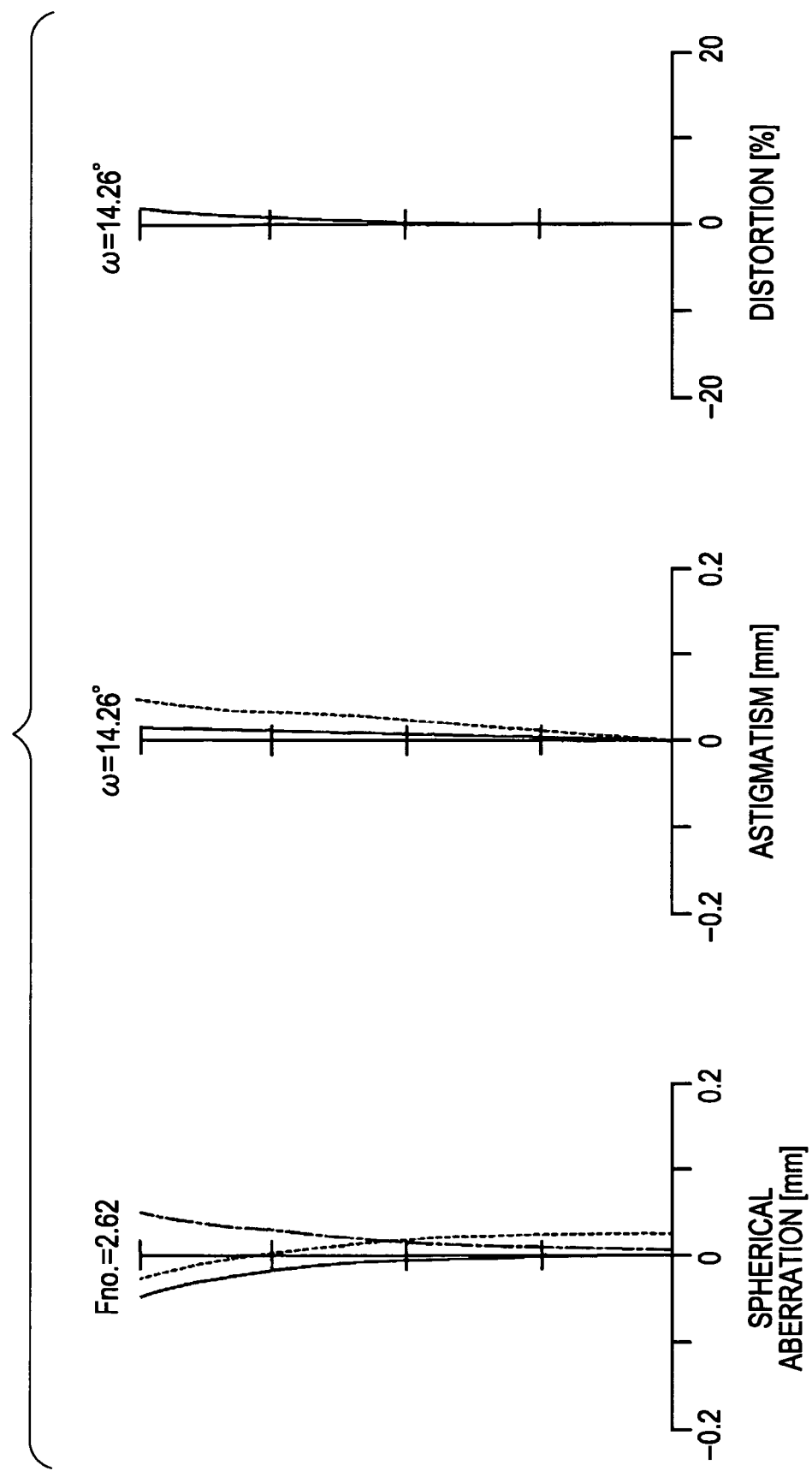
FIG. 3 illustrates spherical aberration, astigmatism, and distortion at an intermediate focal length.
Figure 4:
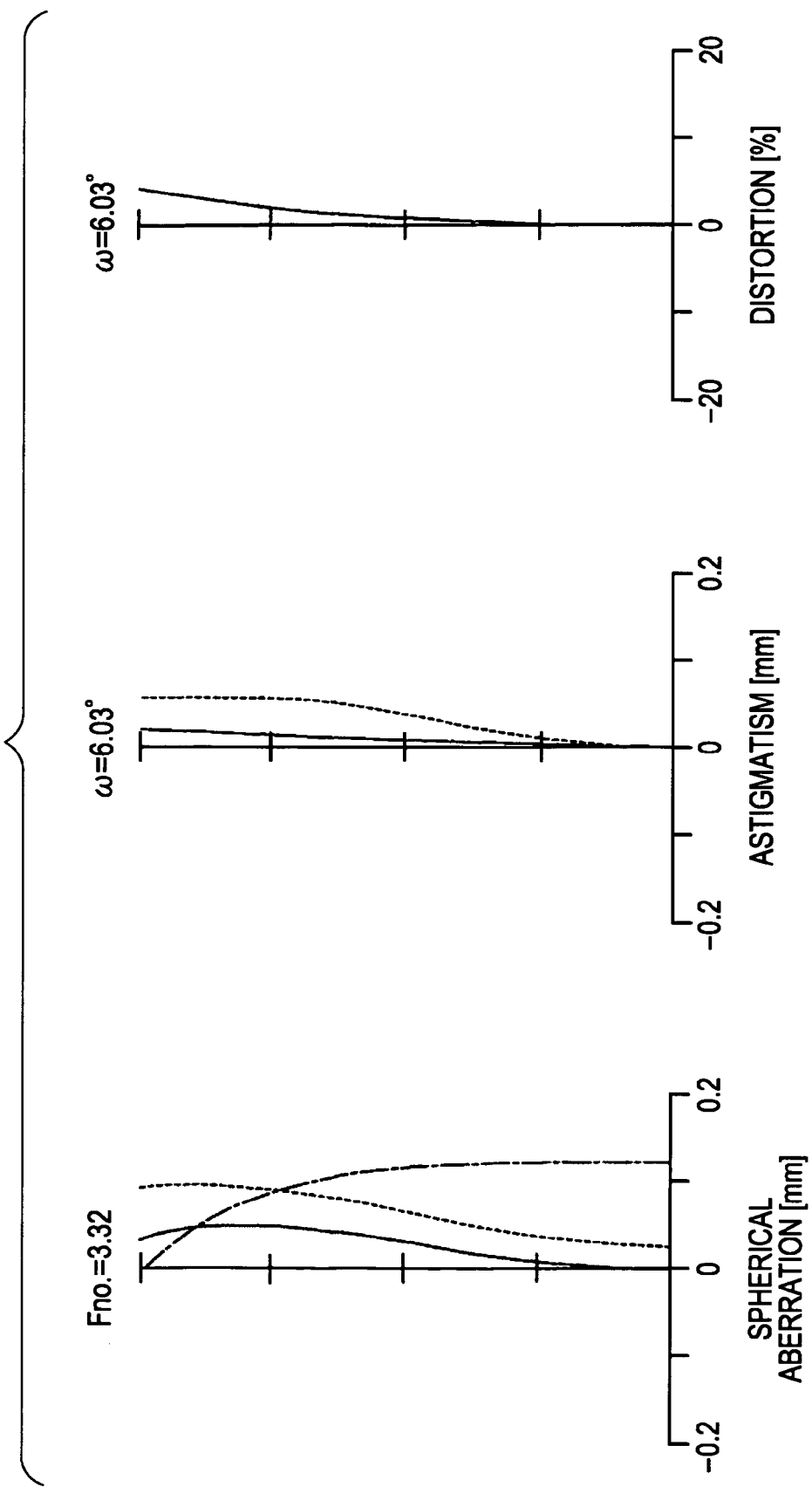
FIG. 4 illustrates spherical aberration, astigmatism, and distortion at a telephoto end.

FIGS. 2 to 4 show aberration diagrams being in focus at infinity according to Numerical Example 1. FIG. 2 illustrates aberration diagrams at the wide-angle end (focal length f=4.814). FIG. 3 illustrates aberration diagrams at the intermediate focal length (focal length f=11.384). FIG. 4 illustrates aberration diagrams at the telephoto end (focal length f=26.890).

In spherical aberration diagrams in FIGS. 2 to 4, the solid line represents a value at the d-line (wavelength: 587.56 nm), the dotted line represents a value at the C-line (wavelength 656.3 nm), and the dotted-chain line represents a value at the g-line (wavelength: 435.8 nm). In astigmatism aberration diagrams in FIGS. 2 to 4, the solid line represents a value at a sagittal image plane, and the broken line represents a value at a meridional image plane.

In the aberration diagrams, it is found that the aberration is reliably corrected and a good image forming performance is provided in Numerical Example 1.

Figure 5:
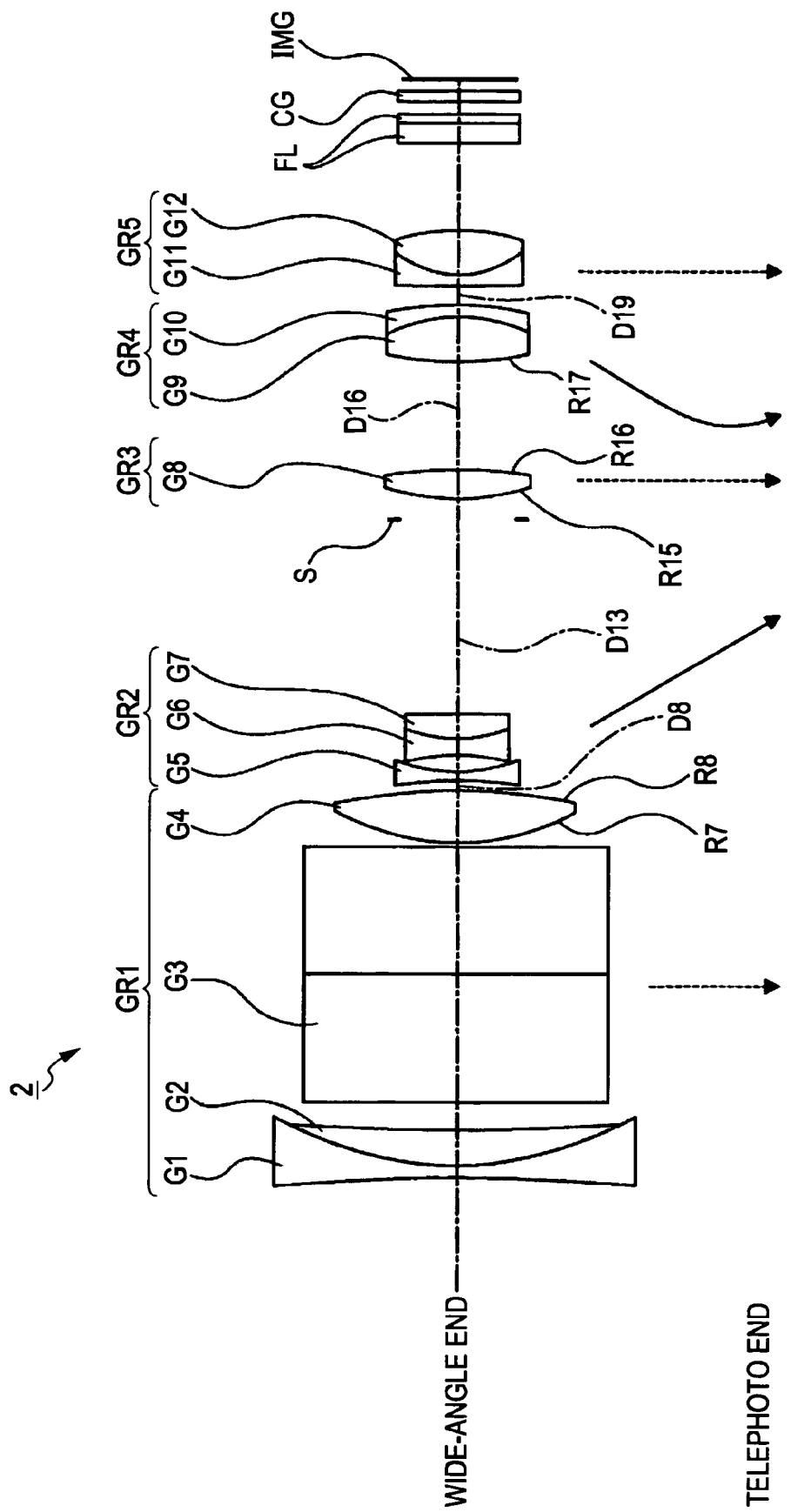
FIG. 5 illustrates a lens configuration of a zoom lens according to a second embodiment of the present invention.

FIG. 5 illustrates a lens configuration of a zoom lens 2 according to a second embodiment of the present invention.

Referring to FIG. 5, the zoom lens 2 of the second embodiment includes twelve lenses (including a prism which is an optical member).

The zoom lens 2 includes a first lens group GR1 having a positive refractive power, a second lens group GR2 having a negative refractive power, a third lens group GR3 having a positive refractive power, a fourth lens group GR4 having a positive refractive power, and a fifth lens group GR5 having a negative refractive power, in that order from the object side.

In the zoom lens 2, the second lens group GR2 and the fourth lens group GR4 are moved in the optical axis direction during zooming between the wide-angle end and the telephoto end.

The first lens group GR1 includes a negative lens G1, a positive lens G2 which has a meniscus shape with a convex surface facing the object side, an optical member (prism) G3 for bending the optical axis by 90 degrees, and a positive lens G4 having aspherical surfaces on both surfaces. The negative lens G1 and the positive lens G2 define a front lens group. The positive lens G4 defines a rear lens group. The negative lens G1 and the positive lens G2 form a cemented lens having a bonding surface R2, at which a concave surface at the image side of the negative lens G1 is bonded to a convex surface at the object side of the positive lens G2. The concave surface and the convex surface have the same curvature radius.

The second lens group GR2 includes a negative lens G5, a negative lens G6, and a positive lens G7, in that order from the object side. The negative lens G6 and the positive lens G7 form a cemented lens having a bonding surface R12, at which a concave surface at the image side of the negative lens G6 is bonded to a convex surface at the object side of the positive lens G7. The concave surface and the convex surface have the same curvature radius.

The third lens group GR3 includes a positive lens G8 having aspherical surfaces on both surfaces.

The fourth lens group GR4 includes a positive lens G9 with an object-side surface being an aspherical surface, and a negative lens G10 having a meniscus shape with a concave surface facing the object side. The positive lens G9 and the negative lens G10 form a cemented lens having a bonding surface R18, at which a convex surface at the image side of the positive lens G9 is bonded to a concave surface at the object side of the negative lens G10. The convex surface and the concave surface have the same curvature radius.

The fifth lens group GR5 includes a negative lens G11 having a meniscus shape with a convex surface facing the object side, and a positive lens G12. The negative lens G11 and the positive lens G12 form a cemented lens having a bonding surface R21, at which a concave surface at the image side of the negative lens G11 is bonded to a convex surface at the object side of the positive lens G12. The concave surface and the convex surface have the same curvature radius.

An aperture stop S (aperture stop surface R14) is arranged between the second lens group GR2 and the third lens group GR3. The aperture stop S is fixed.

A filter FL and a cover glass CG are arranged between the fifth lens group GR5 and an image plane IMG, in that order from the object side.

Table 4 shows lens data of Numerical Example 2 to which specific numerical values are applied to the zoom lens 2 according to the second embodiment.

TABLE 4

| Surface No. | Ri | Di | Ni | νi |
|---|---|---|---|---|
| 1 | −125.18 | 0.7386 | 1.84666 | 23.78 |
| 2 | 21.20 | 1.8614 | 1.61800 | 63.39 |
| 3 | 119.19 | 1.7361 | | |
| 4 | ∞ | 7.5046 | 1.83400 | 37.34 |
| 5 | ∞ | 7.5046 | 1.83400 | 37.34 |
| 6 | ∞ | 0.2000 | | |
| 7 (ASP) | 14.20 | 3.0212 | 1.62263 | 58.16 |
| 8 (ASP) | −24.70 | Variable | | |
| 9 | −141.70 | 0.7000 | 1.88300 | 40.8 |
| 10 | 7.39 | 1.0096 | | |
| 11 | −7.83 | 0.7097 | 1.83481 | 42.72 |
| 12 | 7.06 | 1.4626 | 1.92286 | 20.88 |
| 13 | −60.30 | Variable | | |
| 14 (Aperture stop) | ∞ | 1.2000 | | |
| 15 (ASP) | 10.66 | 1.8405 | 1.62263 | 58.16 |
| 16 (ASP) | −28.05 | Variable | | |
| 17 (ASP) | 22.74 | 2.2968 | 1.80139 | 45.45 |
| 18 | −9.02 | 0.7470 | 1.92286 | 20.88 |
| 19 | −20.59 | Variable | | |
| 20 | −119.96 | 0.7000 | 1.90366 | 31.32 |
| 21 | 5.70 | 2.4380 | 1.48749 | 70.44 |
| 22 | −10.44 | 5.0636 | | |
| 23 | ∞ | 1.1200 | 1.55232 | 63.4 |
| 24 | ∞ | 0.4300 | 1.56384 | 60.83 |
| 25 | ∞ | 1.0000 | | |
| 26 | ∞ | 0.5000 | 1.51680 | 64.2 |
| 27 | ∞ | 0.8000 | | |
| IMG | ∞ | | | |

In the zoom lens 2, an object-side surface (R7) of the positive lens G4 of the first lens group GR1, an image-side surface (R8) of the positive lens G4 of the first lens group GR1, an object-side surface (R15) of the positive lens G8 of the third lens group GR3, an image-side surface (R16) of the positive lens G8 of the third lens group GR3, and an object-side surface (R17) of the positive lens G9 of the fourth lens group GR4 are aspherical surfaces. Table 2 shows aspherical coefficients A4, A6, A8, and A10 of 4th, 6th, 8th, and 10th orders of the aspherical surfaces of Numerical Example 2, together with conic constants κ.

TABLE 5

|  | κ | A4 | A6 | A8 | A10 |
|---|---|---|---|---|---|
| 7th surface | 0.000 | −0.348337E−4 | −0.579595E−7 | −0.303481E−9 | 0.000E+00 |
| 8th surface | 0.000 | 0.686634E−4 | −0.185722E−6 | 0.592016E−9 | 0.000E+00 |
| 15th surface | 0.000 | −0.205601E−3 | −0.512977E−5 | −0.144324E−7 | 0.000E+00 |
| 16th surface | 0.000 | 0.145573E−4 | −0.464679E−5 | −0.294080E−7 | 0.000E+00 |
| 17th surface | 0.000 | −0.184066E−3 | 0.711174E−6 | 0.296146E−9 | 0.000E+00 |

In the zoom lens 2, during zooming from the wide-angle end to the telephoto end, a surface distance D8 between the first lens group GR1 and the second lens group GR2, a surface distance D13 between the second lens group GR2 and the third lens group GR3 (aperture stop S), a surface distance D16 between the third lens group GR3 and the fourth lens group GR4, and a surface distance D19 between the fourth lens group GR4 and the fifth lens group GR5 are variable. Table 6 shows variable distances of the surface distances at the wide-angle end (focal length f=4.570), the intermediate focal length (focal length f=11.754), and the telephoto end (focal length f=25.160) in Numerical Example 2, together with F-numbers Fno. and half view angles ω.

TABLE 6

| f | 4.570 | 11.754 | 25.160 |
|---|---|---|---|
| Fno. | 2.519 | 2.574 | 3.123 |
| ω | 36.232 | 13.829 | 6.410 |
| D8 | 0.500 | 6.846 | 10.559 |
| D13 | 11.493 | 5.147 | 1.434 |
| D16 | 6.458 | 4.016 | 4.013 |
| D19 | 1.251 | 3.693 | 3.691 |

Figure 6:
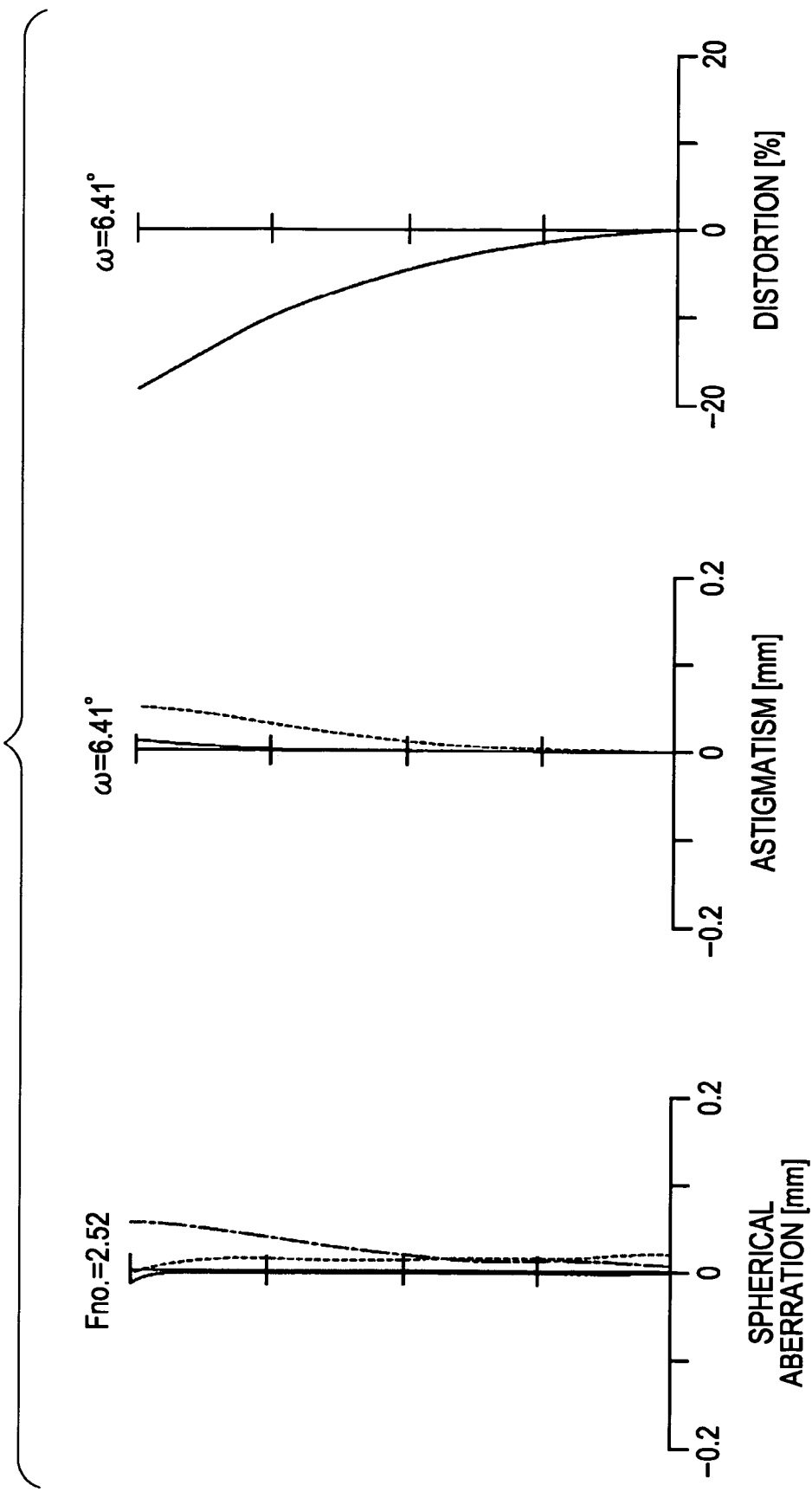
FIG. 6 illustrates aberration diagrams of a numerical example to which specific numerical values are applied to the second embodiment together with FIGS. 7 and 8, and illustrates spherical aberration, astigmatism, and distortion at a wide-angle end.
Figure 7:
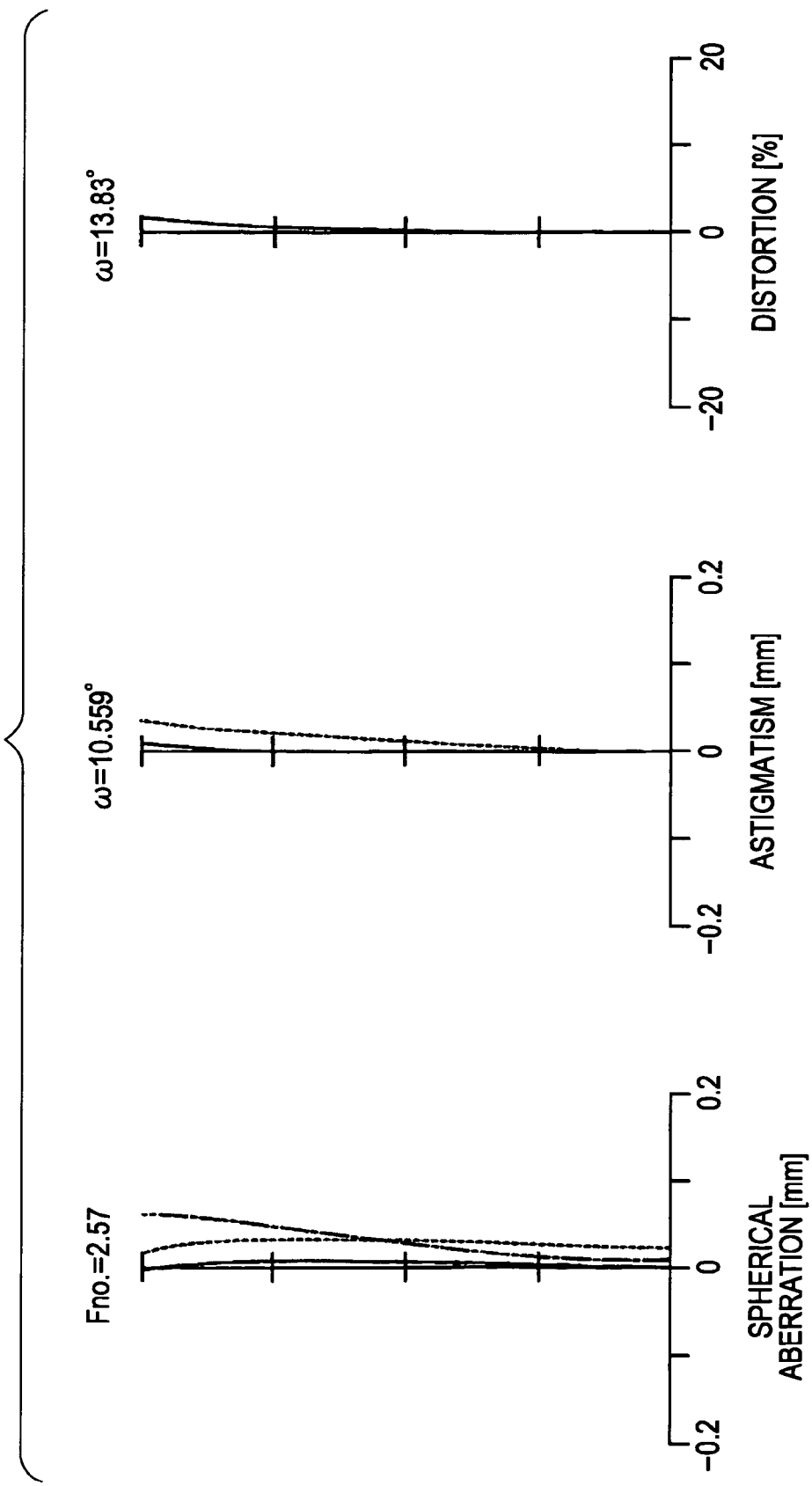
FIG. 7 illustrates spherical aberration, astigmatism, and distortion at an intermediate focal length.
Figure 8:
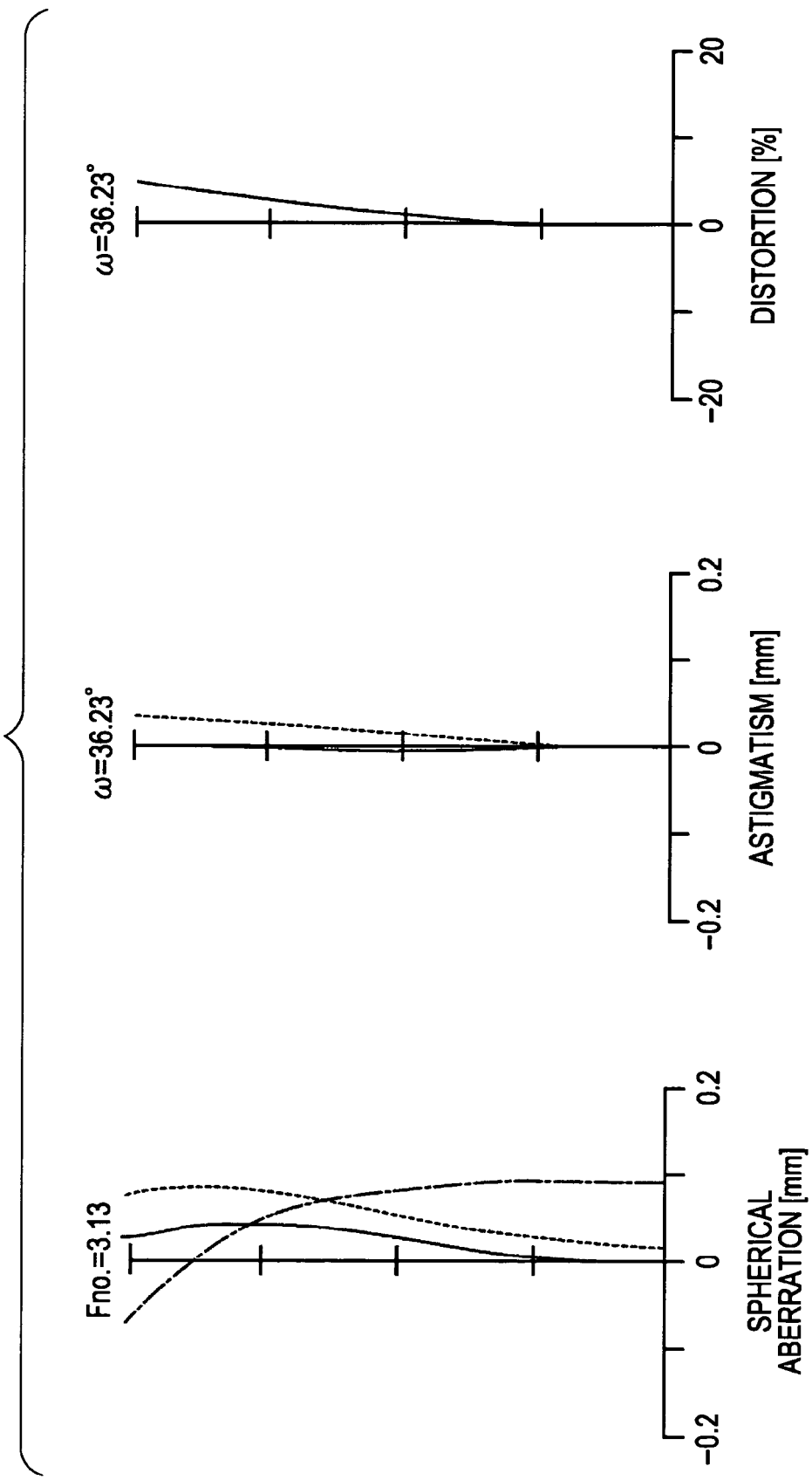
FIG. 8 illustrates spherical aberration, astigmatism, and distortion at a telephoto end.

FIGS. 6 to 8 show aberration diagrams being in focus at infinity according to Numerical Example 2. FIG. 6 illustrates aberration diagrams at the wide-angle end (focal length f=4.570). FIG. 7 illustrates aberration diagrams at the intermediate focal length (focal length f=11.754). FIG. 4 illustrates aberration diagrams at the telephoto end (focal length f=25.160).

In spherical aberration diagrams in FIGS. 6 to 8, the solid line represents a value at the d-line (wavelength: 587.56 nm), the dotted line represents a value at the C-line (wavelength 656.3 nm), and the dotted-chain line represents a value at the g-line (wavelength: 435.8 nm). In astigmatism aberration diagrams in FIGS. 6 to 8, the solid line represents a value at a sagittal image plane, and the broken line represents a value at a meridional image plane.

In the aberration diagrams, it is found that the aberration is reliably corrected and a good image forming performance is provided in Numerical Example 2.

Table 7 shows respective values of Conditional Expressions (1) to (3) of the zoom lenses 1 and 2. In particular, Table 7 shows f1, fw, and f1/fw of Conditional Expression (1), f11, f12, and f11/f12 of Conditional Expression (2), and f1a, and f1a/f1 of Conditional Expression (3).

TABLE 7

|  |  | Zoom lens 1 | Zoom lens 2 |
|---|---|---|---|
|  | f1 | 17.330 | 16.010 |
|  | fW | 4.810 | 4.570 |
| Conditional Expression (1) | f1/fW | 3.603 | 3.503 |
|  | f11 | −28.070 | −21.154 |
|  | f12 | 71.280 | 41.270 |

TABLE 7-continued

|  |  | Zoom lens 1 | Zoom lens 2 |
|---|---|---|---|
| Conditional Expression (2) | f11/f12 | −0.394 | −0.513 |
|  | f1a | −45.450 | −42.299 |
| Conditional Expression (3) | f1a/f1 | −2.623 | −2.642 |

As shown in Table 7, the zoom lenses 1 and 2 satisfy Conditional Expressions (1) to (3).

Next, an image pickup apparatus according to an embodiment of the present invention is described.

The image pickup apparatus of the embodiment includes a zoom lens, and an image pickup device that converts an optical image formed by the zoom lens into an electric signal.

The zoom lens in the image pickup apparatus includes a first lens group having a positive refractive power, a second lens group having a negative refractive power, a third lens group having a positive refractive power, a fourth lens group having a positive refractive power, and a fifth lens group having a negative refractive power, in that order from the object side. Zooming is performed by moving the second lens group and the fourth lens group in an optical-axis direction.

The first lens group includes a front lens group having a negative refractive power, an optical member for bending an optical path, and a rear lens group having a positive refractive power, in that order from the object side. The front lens group is a cemented lens in which a first lens having a negative refractive power is bonded to a second lens having a positive refractive power in that order from the object side to the image side.

As described above, according to the image pickup apparatus of this embodiment, in the zoom lens, since the front lens group is the cemented lens of the first lens having the negative refractive power and the second lens having the positive refractive power, aberration appearing at the first lens can be corrected by the second lens having the positive refractive power. In particular, since the front lens group is the cemented lens, if the refractive power of the second lens group is increased, for example, if magnification is increased so as to have a zoom ratio of 5× or higher, chromatic aberration, such as axial chromatic aberration and transverse chromatic aberration, appearing due to the increase in magnification can be reliably corrected. Thus, the magnification can be increased without the optical performance being deteriorated.

Also, since the front lens group is the cemented lens, the structure of a lens barrel can be simplified, and an increase in sensitivity on account of an assembly error can be suppressed.

Figure 9:
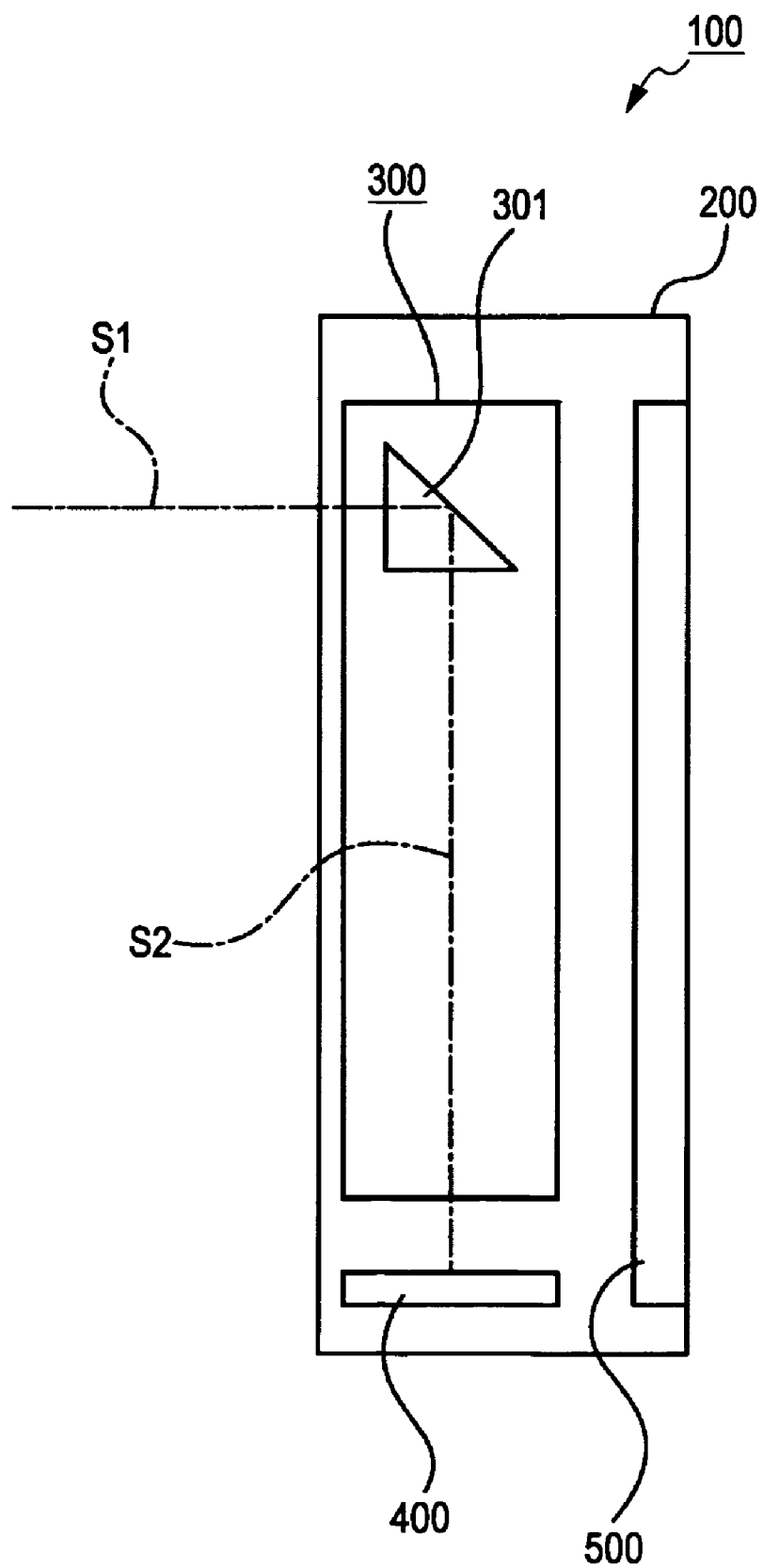
FIG. 9 briefly illustrates a digital still camera as an image pickup apparatus according to an embodiment of the present invention.

FIG. 9 briefly illustrates a digital still camera as an image pickup apparatus according to an embodiment of the present invention.

An image pickup apparatus (digital still camera) 100 includes predetermined components arranged in a camera casing 200. A zoom lens 300 is arranged in the camera casing 200. The zoom lens 300 may be the above-described zoom lens 1 or the zoom lens 2. The zoom lens 300 includes twelve lenses including an optical member (prism) 301. The optical member 301 bends an optical path of the zoom lens 300 by 90 degrees.

An image pickup device 400 is arranged below the zoom lens 300. In the image pickup apparatus 100, an optical-axis direction S1 extending to the object side from the optical member 301 is, for example, a front-rear direction, and an optical-axis direction S2 extending to the image side from the optical member 301 is, for example, an up-down direction. Hence, in the image pickup apparatus 100, the front-rear length can be reduced.

A display unit 500, for example, a liquid crystal display panel is arranged at a rear surface of the camera casing 200. The display unit 500 is used for alignment of the field angle during shooting.

Figure 10:
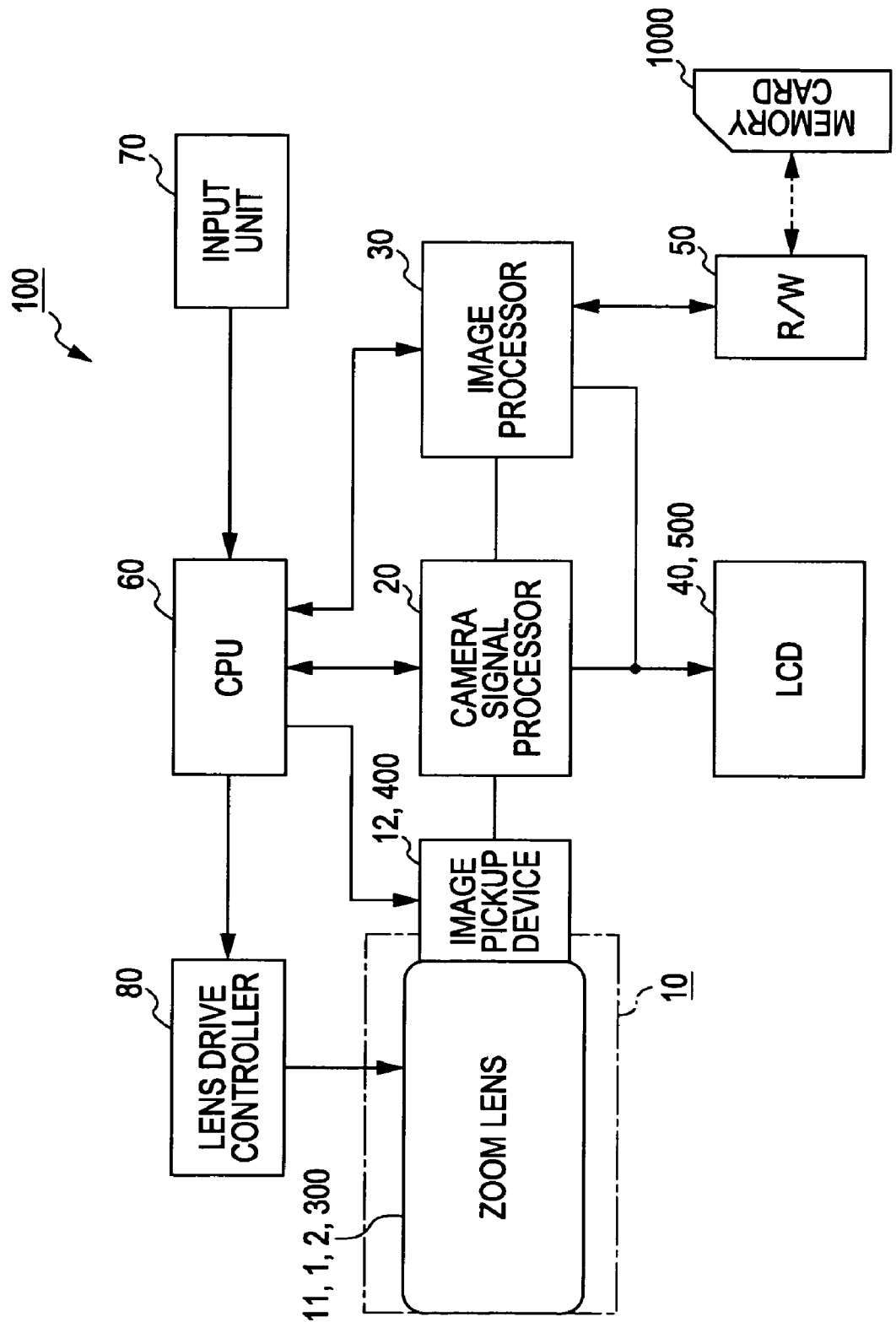
FIG. 10 is a block diagram showing an image pickup apparatus according to an embodiment.

FIG. 10 briefly illustrates a digital still camera as an image pickup apparatus according to an embodiment of the present invention.

The image pickup apparatus 100 includes a camera block 10 having an image pickup function, a camera signal processor 20 that performs signal processing such as analogue-to-digital conversion of a captured image signal, an image processor 30 that performs recording and reproducing processing of the image signal, a liquid crystal display (LCD) 40 (the above-described display unit 500) that displays the captured image and the like, a reader/writer (R/W) 50 that performs reading and writing of the image signal to and from a memory card 1000, a central processing unit (CPU) 60 that controls the entire image pickup apparatus, an input unit 70 with which a user performs a predetermined operation, and a lens drive controller 80 that controls driving of a lens arranged in the camera block 10.

The camera block 10 includes a zoom lens 11 (the zoom lens 1 or 2 to which the present invention is applied, or the above-described zoom lens 300), and an image pickup device 12 (the above-described image pickup device 400), such as a charge coupled device (CCD) or a complementary metal oxide semiconductor (CMOS).

The camera signal processor 20 performs, for example, conversion of an output signal from the image pickup device 12 into a digital signal, noise rejection, image quality correction, and conversion to a luminance signal and a color-difference signal.

The image processor 30 performs compression/encoding and decompression/decoding of the image signal based on a predetermined image data format, and conversion of a data specification such as resolution.

The LCD 40 has a function of displaying an operation state of the user with the input unit 70, and various data such as the captured image.

The R/W 50 performs writing of the image data encoded by the image processor 30 to the memory card 1000, and reading of the image data stored in the memory card 1000.

The CPU 60 functions as a control processor that controls circuit blocks provided in the image pickup apparatus 100. The CPU 60 controls the circuit blocks on the basis of, for example, an instruction input signal from the input unit 70.

The input unit 70 is, for example, a shutter release button for a shutter operation, and a selection switch for selection of an operation mode. The input unit 70 outputs an instruction input signal to the CPU 60 in accordance with the operation of the user.

The lens drive controller 80 controls a motor and the like (not shown) that drives the lenses of the zoom lens 11 on the basis of a control signal from the CPU 60.

The memory card 1000 is, for example, a semiconductor memory detachably attached to a slot connected to the R/W 50.

The operation of the image pickup apparatus 100 is described below.

In a standby state of shooting, under the control of the CPU 60, the image signal captured at the camera block 10 is output to the LCD 40 via the camera signal processor 20. The image signal is displayed on the LCD 40 as a camera through image. When an instruction input signal for zooming is input from the input unit 70, the CPU 60 outputs a control signal to the lens drive controller 80. Under the control of the lens drive controller 80, a predetermined lens of the zoom lens 11 is moved.

When a shutter (not shown) of the camera block 10 is operated by an instruction input signal from the input unit 70, the captured image signal is output from the camera signal processor 20 to the image processor 30, compressed and encoded, and converted into digital data of a predetermined data format. The converted data is output to the R/W 50, and is written in the memory card 1000.

Focusing is performed, for example, when the shutter release button of the input unit 70 is half pressed or fully pressed for recording (shooting). During focusing, the lens drive controller 80 moves a predetermined lens of the zoom lens 11 on the basis of a control signal from the CPU 60.

To reproduce the image data stored in the memory card 1000, predetermined image data is read from the memory card 1000 by the R/W 50 in accordance with the operation with the input unit 70. The image processor 30 performs decompression/decoding processing, and the reproduced image signal is output to the LCD 40 for displaying the reproduced image.

While the image pickup apparatus is applied to the digital still camera in the above-described embodiment, the application of the image pickup apparatus is not limited to the digital still camera, and may be applied to a digital video camera, or a camera section of a digital input/output apparatus such as a mobile phone with a camera, or a personal digital assistant (PDA) with a camera.

The present application contains subject matter related to that disclosed in Japanese Priority Patent Application JP 2008-065985 filed in the Japan Patent Office on Mar. 14, 2008, the entire content of which is hereby incorporated by reference.

The shapes and numerical values of the respective parts described in the embodiments are merely examples of implementation of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:

a first lens group having a positive refractive power, a second lens group having a negative refractive power, a third lens group having a positive refractive power, a fourth lens group having a positive refractive power, and a fifth lens group having a negative refractive power in that order from the object side, wherein zooming is performed by moving the second lens group and the fourth lens group in an optical-axis direction, wherein the first lens group includes a front lens group having a negative refractive power, an optical member for bending an optical path, and a rear lens group having a positive refractive power in that order from the object side, and wherein the front lens group is a cemented lens in which a first lens having a negative refractive power is bonded to a second lens having a positive refractive power in that order from the object side to the image side.

2. The zoom lens according to claim 1, wherein Conditional Expressions (1) and (2) are satisfied as follows $$2.5 < f1/fw < 7.0 \quad (1)$$

$$-0.7 < f11/f12 < -0.15 \quad (2)$$

where f1 is a focal length of the first lens group, fw is a focal length of the whole lens system at a wide-angle end, f11 is a focal length of the first lens, and f12 is a focal length of the second lens.

3. The zoom lens according to claim 1, wherein the second lens is a meniscus lens having a positive refractive power, a convex surface of the second lens facing the object side.

4. The zoom lens according to claim 1, wherein Conditional Expression (3) is satisfied as follows $$-3.6 < f1a/f1 < -0.8 \quad (3)$$

where f1a is a focal length of the front lens group, and f1 is a focal length of the first lens group.

5. The zoom lens according to claim 1, wherein at least one surface of the first lens group is an aspherical surface.

6. An image pickup apparatus comprising:

a zoom lens; and an image pickup device that converts an optical image formed by the zoom lens into an electric signal, wherein the zoom lens includes a first lens group having a positive refractive power, a second lens group having a negative refractive power, a third lens group having a positive refractive power, a fourth lens group having a positive refractive power, and a fifth lens group having a negative refractive power in that order from the object side, wherein zooming is performed by moving the second lens group and the fourth lens group in an optical-axis direction, wherein the first lens group includes a front lens group having a negative refractive power, an optical member for bending an optical path, and a rear lens group having a positive refractive power in that order from the object side, and wherein the front lens group is a cemented lens in which a first lens having a negative refractive power is bonded to a second lens having a positive refractive power in that order from the object side to the image side.

* * * * *